United States Patent [19]

Milkowski et al.

[11] 3,869,459

[45] Mar. 4, 1975

[54] N₁-(BENZOYL)ALKYL-N₂(PHENOXY-2-HYDROXYPROPYL AND N₁-(BENZOYL)-ALKYL-N₂-(PHENYLTHIO-2-HYDROXYLPROPYL)PIPERAZINES

[75] Inventors: Wolfgang Milkowski, Burgdorf; Horst Zeugner, Hannover; Klaus-Wolf Von Eickstedt, Isernhagen N. B.; Werner Stuhmer, Eldagsen, all of Germany

[73] Assignee: Kali-Chemie Aktiengesellschaft, Hannover, Germany

[22] Filed: Sept. 12, 1972

[21] Appl. No.: 288,321

[30] Foreign Application Priority Data
July 26, 1972 Germany............................ 2236679
Sept. 13, 1971 Germany............................ 2145683

[52] U.S. Cl....260/268 R, 260/239 BC, 260/247.5 D, 260/615 R, 424/250, 424/244
[51] Int. Cl............................................... C07d 51/70
[58] Field of Search ................................ 260/268 R

[56] References Cited
UNITED STATES PATENTS

| | | | |
|---|---|---|---|
| 2,695,293 | 11/1954 | Swain............................ | 260/268 R |
| 2,695,295 | 11/1954 | Swain............................ | 260/268 R |
| 2,881,172 | 4/1959 | Weston.......................... | 260/268 R |
| 2,981,735 | 4/1961 | Morren.......................... | 260/268 R |
| 3,000,892 | 9/1961 | Janssen.......................... | 260/268 R |
| 3,165,523 | 1/1965 | Vargha.......................... | 260/268 R |
| 3,637,704 | 1/1972 | Umemoto ...................... | 260/268 R |
| 3,701,777 | 10/1972 | Edenhofer...................... | 260/268 R |
| 3,711,484 | 1/1973 | Pedrazzoli...................... | 260/268 R |
| 3,718,650 | 2/1973 | Mauvernay ..................... | 210/268 R |

*Primary Examiner*—Donald G. Daus
*Assistant Examiner*—D. Wheeler
*Attorney, Agent, or Firm*—Michael S. Striker

[57] ABSTRACT

$N_1$-(Benzoyl)alkyl-$N_2$-(phenoxy-2-hydroxypropyl) and $N_1$-(benzoyl)alkyl-$N_2$-(phenylthio-2-hydroxylpropyl)-piperazines having the formula

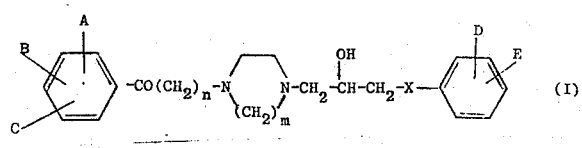

in which A, B, and C are the same or different and are hydrogen, halogen, or lower alkoxy, D and E are the same or different and are hydrogen, halogen, fluoromethyl, lower nontertiary alkyl, alkoxy or alkanoylamino, or nonadjacent nitro, X is oxygen or sulfur, lower in these groups indicating 1 to 4 carbon atoms, and n and m being 2 or 3; and pharmaceutically acceptable acid addition compounds of said piperazines. The compounds of the invention are useful as sedatives having an analgesic and anti-histaminic effect and are of a low toxicity.

45 Claims, No Drawings

$N_1$-(BENZOYL)ALKYL-$N_2$-(PHENOXY-2-HYDROXYPROXPROPYL) AND $N_1$-(BENZOYL)ALKYL-$N_2$-(PHENYLTHIO-2-HYDROXYPROPYL) PIPERAZINES

DETAILS OF THE INVENTION AND PREFERRED EMBODIMENTS

This invention pertains to $N_1$-(benzoyl)-alkyl-$N_2$-(phenyl-2-hydroxypropyl) and $N_1$-benzoyl)alkyl-$N_2$-(phenylthio-2-hydroxypropyl)piperazines having the following formula:

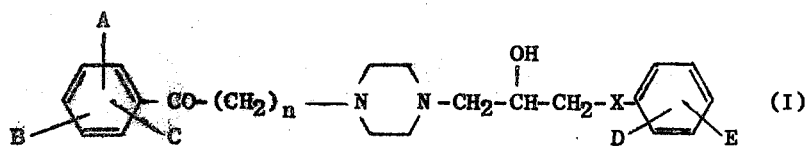

in which A, B and C are each a hydrogen, halogen, or an alkoxy group, the alkyl moiety of which has up to 4 carbon atoms, D and E are each a hydrogen, halogen, trifluoromethyl, nontertiary alkyl, alkoxy, or alkanoylamino group, the alkyl moiety of which has up to 4 carbon atoms, or nonadjacent nitro groups, X is oxygen or sulfur, and n is 2 or 3, and pharmaceutically acceptable acid addition salts thereof.

PROCESS OF MAKING THE COMPOUNDS

The compounds of the invention wherein $n = 2$ are obtained by reacting a piperazine propanol or homopiperazine propanol of the formula

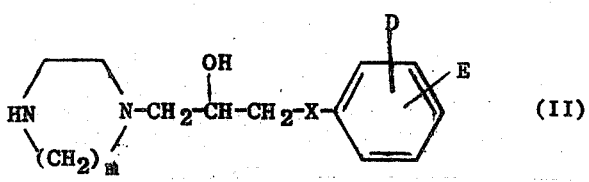

in which m, X, D and E have the same meaning as specified hereinbefore are reacted with formaldehyde and an acetophenone of the formula

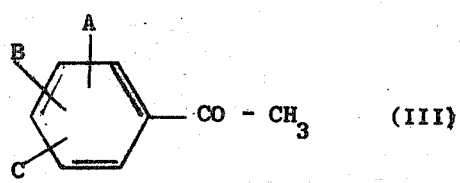

wherein A, B, and C have the same meaning as as specified hereinbefore, the reaction being carried out in the presence of a mineral acid such as hydrochloric acid at an elevated temperature which generally is between about 50° and 150°C. The salt, for instance the dihydrochloride, thus obtained of the compounds of formula I is then isolated from the reaction mass. The pure base may be obtained from the salt.

The piperazine- or homopiperazine propanol of the above formula II which is used as one of the starting products may also be used in the form of its dihydrochloride so as to furnish the hydrochloric acid which is necessary for the reaction. In some cases it is advantageous to carry out the reaction in a polar solvent preferably ethanol.

To make the 1,4-disubstituted piperazine- or homopiperazine propanols of the formula I wherein $n = 2$ or 3 compounds of the above formula II are reacted with ω-halogenoketone of the formula

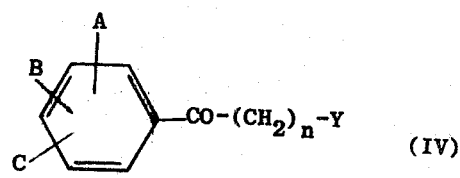

wherein A, B, C, and n have the meaning above given and Y is halogen, preferably chlorine. The reaction is carried out at an elevated temperature in the presence of an acid acceptor for instance a tertiary amine such as triethylamine, sodium carbonate, sodium bicarbonate and preferably potassium carbonate. As the acid binding agent or acid acceptor it is also possible to employ an excess of the amine.

The reaction can also be carried out in an inert solvent at the boiling point of the solvent. Suitable solvents are for instance xylene, toluene, n-butanol or methylisobutylketone.

In order to obtain the desired compound the crude base obtained in the main reaction is preferably converted to its acid addition product, for instance the dihydrochloride, from which then the substantially pure base may be obtained if desired.

The reaction of the compounds of formula II with a γ-halogenobutyrophenone of formula IV in an inert solvent in the presence of an acid acceptor may also be carried out under milder conditions and with a better yield by converting the γ-halogenobutyrophenone, prior to the reaction, to the corresponding γ-halogenobutyroketal of the formula

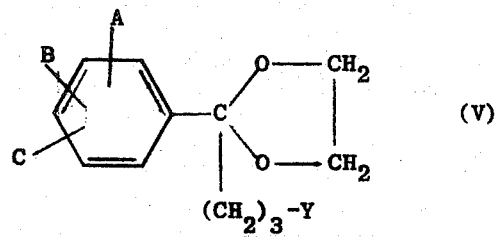

wherein A, B, C and Y have the meaning as in formula IV. This can be accomplished by reacting the γ-halogenobutyrophenone with ethyleneglycol under acidic conditions. Thus the keto group is protected during the main reaction. The desired compound of the formula I can then be obtained by splitting off the ketal group after completion of the main reaction with dilute hydrochloric acid. The desired compound can then be isolated in the form of its dihydrochloride.

In order to make compounds of the general formula I in which A is secondary amine and B and C are hydrogen compounds of the formula I previously obtained in which A is fluorine and B and C are hydrogen are reacted in a polar solvent, preferably dimethylsulfoxide with a secondary amine at an elevated temperature.

To make the non-toxic acid addition salts any pharmaceutically acceptable acid may be used in addition to hydrochloric acid. Examples are acetic acid, propionic acid, diethyl acetic acid, malonic acid, succinic acid, fumaric acid, maleic acid, lactic acid, tartaric acid, malic acid, citric acid, sulfuric acid, hydrobromic acid or orthophosphoric acid. These acid addition compounds can be used for the pharmaceutical purposes of the invention like the free base and have the special advantage that they are soluble in water.

UTILITY

The compounds of the invention surprisingly are sedatives which have additionally an analgesic effect and an anti-histaminic action. They are of low toxicity. They are useful for the treatment of mental conditions.

If the compounds are employed in the form of water soluble substances, they may be administered as aqueous solutions. If the compounds are water insoluble they may be administered in the form of suspensions for instance in 1 percent methyl cellulose (tylose) solution.

The dosage will vary according to the requirements of the individual case. It should be within the range wherein the desired sedative effect can be obtained. The dosage can be determined in the light of the tests which follow.

The activity of the compounds of the invention was determined by comparing them with compounds usually employed for the same purpose. The comparison compounds involved in the following tests were these:

1. $N_1$-[3-(4'-fluorobenzoyl)-propyl]-$N_2$-(3-phenoxy-2-hydroxypropyl)-piperazine dihydrochloride.
2. $N_1$-[3-(4'-fluorobenzoyl)-propyl]-$N_2$-(3-phenthio-2-hydroxypropyl)-piperazine dihydrochloride hydrate.
3. $N_1$-[3-(4'-fluorobenzoyl)-propyl]-$N_2$-[3-(2'-chlorophenoxy)-2-hydroxypropyl]-piperazine dihydrochloride.
4. $N_1$-[3-(4'-fluorobenzoyl)-propyl]-$N_2$-[3-(2'-methylphenoxy)-2-hydroxypropyl]-piperazine dihydrochloride.
5. $N_1$-[3-(4'-fluorobenzoyl)-propyl]-$N_2$-[3-(2'-methoxyphenoxy)-2-hydroxypropyl]-piperazine dihydrochloride.
6. $N_1$-[3-(4'-fluorobenzoyl)-propyl]-$N_2$-[3,(4'-nitrophenoxy)-2-hydroxypropyl]-piperazine dihydrochloride.
7. $N_1$-[3-(4'-methoxybenzoyl)-propyl]-$N_2$-(3-phenoxy-2-hydroxypropyl)-homopiperazine dimaleinate.

The mean lethal dose ($LD_{50}$) was determined by administering the compounds per os to male albino mice of the genus NMRI. The results obtained are included in Table 1 below.

The analgesic effect of the compounds was determined by the Writhing test. The test compounds were administered to the same type of albino mice employing the method described by E. Sigmund, R. Cadmus and G. Lu in Proc. Soc. exp. Biol., N.Y. 95 (1957), page 729. 30 minutes later 1.5 mg of phenolquinone per kg of body weight was administered into the abdominal cavity of the test animals. As comparison substances there were used 100 mg per kg of aminopyrine (amidopyrine and 14.7 mg per kg of morphine per os.

The Figures in Table 1 below show the amounts administered per os of the compounds of the invention (in mg/kg) which have the same effect as the stated dose of the comparison compounds.

TABLE 1

| Compound of Example | $LD_{50}$ mg/kg | Writhing test 100 mg/kg aminopyrine mg/kg | 14.7 mg/kg morphine mg/kg | 300% extension of duration of hexobarbital induced sleep mg/kg |
| --- | --- | --- | --- | --- |
| 1 | 390 | 6.8 | 15.0 | 10.0 |
| 2 | 841 | 10.0 | 31.6 | 3.2 |
| 3 | 365 | 31.6 | 46.4 | 4.6 |
| 4 | 390 | 21.5 | 46.4 | 10.0 |
| 5 | 464 | 21.5 | 46.4 | 46.4 |
| 6 | 147 | 4.6 | 6.8 | 2.2 |

As the Table shows the compounds of the invention have a strong effect on the typical reflexes of the mice in the Writhing test and exhibit a high analgesic action.

The compounds of the invention in addition have an effect appearing in the extension of duration of hexobarbital induced sleep in mice. To determine this action the compounds identified in Table 1 were applied to the mice per os 30 minutes prior to the administration of the hexobarbital. There was thus determined the amount of each substance expressed in mg per kg of body weight which resulted in an extension of the duration of the hexobarbital induced sleep by 300 percent. These particular results are shown in the entries in the last column of Table 1.

The action of the compounds of the invention in respect of the motor activity of mice was determined in the squirrel cage test employing the method described by H. Weifenbach in Arzneimittel-Forschung 19 (1969), pp. 125 to 127. The results showed that oral administration of the compounds of the invention clearly depressed the running activity of the mice.

As comparison compound in these tests chloropromazine was applied per os in a dose of 3.2 mg per kg of body weight. There were then determined the doses of the compounds of the invention which resulted in the same reduction of the running activity. These results are shown in Table 2.

TABLE 2

| Comparison Compound: Compound of Example | Chloropromazine doses 3.2 mg/kg mg/kg |
| --- | --- |
| 1 | 10.0 |
| 2 | 10.0 |
| 6 | 3.2 |
| 7 | 10.0 |

The following Examples will further illustrate the invention.

EXAMPLE 1

$N_1$-[3-(4'-fluorobenzoyl)-propyl]-$N_2$-[3-(4'-chlorophenoxy)-2-hydroxypropyl]-piperazine dihydrochloride

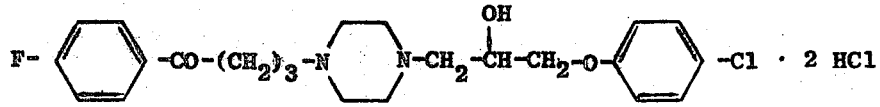

TABLE 2

| Comparison Compound:<br>Compound of Example | Chloropromazine<br>doses 3.2 mg/kg<br>mg/kg |
|---|---|
| 1 | 10.0 |
| 2 | 10.0 |
| 6 | 3.2 |
| 7 | 10.0 |

A mixture of 13.5 g of N-[3-(4'-chlorophenoxy)-2-hydroxypropyl]-piperazine, 12.2 g of 1-(4-fluorophenyl)-4-chloro-1-(ethylenedioxy)butane having the formula

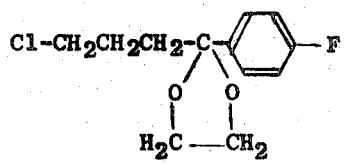

and 10 g of potassium carbonate in 200 ml xylene was heated to 130°C for 20 hours. Following filtration and concentration by evaporation the crude base obtained was dissolved in benzene and the solution was filtered through aluminum oxide (II) by the Brockman method. The benzene eluates were collected and heated for 1 hour under reflux with 25 ml of a 10 percent HCl and 150 ml of isopropanol. The crystals which precipitated upon cooling down of the solution were removed by filtration and recrystallized from isopropanol/water. The yield was 6.2 g. The melting point of the compound obtained was between 209°and 216°C.

EXAMPLE 2

$N_1$-[3-(4'-fluorobenzoyl)-propyl]-$N_2$-(3-phenoxy-2-hydroxypropyl)-piperazine dihydrochloride

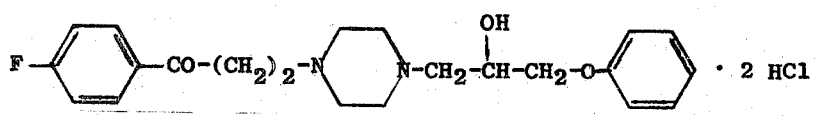

A mixture of 23.7 g of γ-chloro-p-fluorobutyrophenone which is also known as 1-(4-fluorophenyl)-4-chloro-1-butanone and 28 g of N-(2-hydroxy-3-phenoxypropyl)piperazine was heated to 130°C for 12 hours. The reaction product was then treated with chloroform and dilute sodium hydroxide. The thus obtained organic phase was subjected to concentration by evaporation. The resulting crude base was dissolved is benzine and the solution was filtered through aluminum oxide (II). The eluates containing the product were concentrated by evaporation, then dissolved in isopropanol and finally reacted with HCl in isopropanol. The precipitated dihydrochloride was removed by filtration and recrystallized from isopropanol/water. The yield was 12 g. The compound obtained had a melting point between 192°and 197°C.

EXAMPLE 3

$N_1$-[2-(4'-fluorobenzoyl)-ethyl]-$N_2$-[3-(2'-chlorphenoxy)-2-hydroxypropyl]-piperazine dihydrochloride

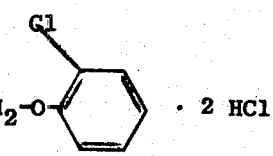

16 g of p-fluoro-acetophenone, 10 g of N-[3-(2'-chlorophenoxy)-2-hydroxypropyl]-piperazine dihydrochloride and 3.5 g of paraformaldehyde were heated under reflux in 250 ml ethanol for 14 hours. The product which precipitated upon cooling down of the mixture was removed by filtration and recrystallized from ethanol. The yield was 4.7 g. The melting point was between 142°and 146°C.

EXAMPLE 4

$N_1$-[2-(4'-fluorobenzoyl)-ethyl]-$N_2$-(3-phenoxy-2-hydroxypropyl)-piperazine dihydrochloride

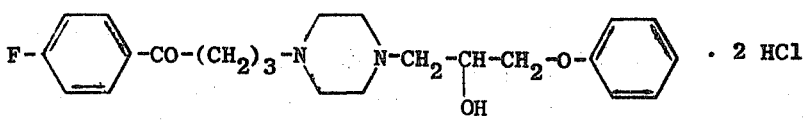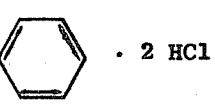

A mixture of 15.5 g of N-(2-hydroxy-3-phenoxypropyl)-piperazine dihydrochloride, 13.8 g of p-fluoroacetophenone and 4.5 g of paraformaldehyde were heated to 110°C for 15 minutes. After cooling the molten mass was stirred with ether. The dihydrochloride which was insoluble in the ether was removed by filtration and recrystallized from ethanol. The yield was 6.8 g. The melting point was between 168°and 174°C.

EXAMPLE 5

$N_1$-[3-(4'-morpholinobenzoyl-propyl)]-$N_2$-(3-phenthio-2-hydroxypropyl)-piperazine dimaleinate 10.8 g of $N_1$-[3-(4'-fluorobenzoyl-propyl)]-$N_2$-(3-phenthio-2-hydroxypropyl)-piperazine were heated with 2.6 g of morpholine in 100 ml anhydrous dimethylsulfoxide upon stirring to 100°C for 72 hours. After cooling the dimethylsulfoxide solution was poured onto ice/water and the base was subsequently extracted with methylene chloride. The crude base (11 g) was subjected to chromatography with benzene/methylene chloride at a ratio of 1 : 1 on aluminum oxide of the activity stage II. The purified base (3.6 g) was reacted with the stoichiometric amount of maleic acid in ethanol. After recrystallization from ethanol/H$_2$O there were obtained 5.0 g of the dimaleate of a melting point between 167° and 168°C.

Further compounds as listed in Table 3 below were then made by the process described in Examples 1 to 4 using the corresponding starting compounds. These compounds are identified by the Example Nos. 6 to 51.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A compound having the formula

TABLE 3

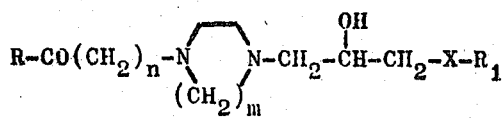

| Ex. | R | R$_1$ | n | m | X | Salt | m.p.(°C) |
|---|---|---|---|---|---|---|---|
| 6 | C$_6$H$_5$ | C$_6$H$_5$ | 2 | 2 | O | 2 HCl | 170–178 |
| 7 | 3—H$_3$CO—C$_6$H$_4$ | C$_6$H$_5$ | 2 | 2 | O | 2 HCl | 165–170 |
| 8 | 4—Cl—C$_6$H$_4$ | C$_6$H$_5$ | 2 | 2 | O | 2 HCl | 175–177 |
| 9 | 4—Cl—C$_6$H$_4$ | 2—Cl—C$_6$H$_4$ | 2 | 2 | O | 2 HCl | 167–170 |
| 10 | C$_6$H$_5$ | 2—Cl—C$_6$H$_4$ | 2 | 2 | O | 2 HCl | 155–161 |
| 11 | 3—H$_3$CO—C$_6$H$_4$ | 2—Cl—C$_6$H$_4$ | 2 | 2 | O | 2 HCl | 162–168 |
| 12 | 4—H$_3$CO—C$_6$H$_4$ | 2—Cl—C$_6$H$_4$ | 2 | 2 | O | 2 HCl | 175–177 |
| 13 | 3,4—H$_3$CO—C$_6$H$_3$ | 2—Cl—C$_6$H$_4$ | 2 | 2 | O | 2 HCl | 179–184 |
| 14 | C$_6$H$_5$ | 2—CH$_3$—C$_6$H$_4$ | 2 | 2 | O | 2 HCl | 173–180 |
| 15 | 3,4,5—H$_3$CO—C$_6$H$_2$ | C$_6$H$_5$ | 2 | 2 | O | 2 HCl | 190 (Zers.) |
| 16 | 4—F—C$_6$H$_4$ | 2—Cl—C$_6$H$_4$ | 3 | 2 | O | 2 HCl | 197–200 |
| 17 | 4—F—C$_6$H$_4$ | 2—CH$_3$—C$_6$H$_4$ | 3 | 2 | O | 2 HCl | 199–204 |
| 18 | 4—F—C$_6$H$_4$ | 2—H$_3$CO—C$_6$H$_4$ | 3 | 2 | O | 2 HCl | 183–187 |
| 19 | 4—F—C$_6$H$_4$ | 4—O$_2$N—C$_6$H$_4$ | 3 | 2 | O | 2 HCl | 190–195 |
| 20 | 4—H$_3$CO—C$_6$H$_4$ | C$_6$H$_5$ | 3 | 3 | O | di-maleinate | 137–138 |
| 21 | 4—H$_3$CO—C$_6$H$_4$ | C$_6$H$_5$ | 3 | 2 | O | di-maleinate | 172–174 |
| 22 | 4—F—C$_6$H$_4$ | C$_6$H$_5$ | 3 | 3 | O | di-maleinate | 142–144 |
| 23 | 4—F—C$_6$H$_4$ | 2—Cl/5—CH$_3$—C$_6$H$_3$ | 3 | 2 | O | 2 HCl | 200–215 |
| 24 | 4—Cl—C$_6$H$_4$ | 2—CH$_3$—C$_6$H$_4$ | 2 | 2 | O | 2 HCl | 173–180 |
| 25 | 4—H$_3$CO—C$_6$H$_4$ | C$_6$H$_5$ | 2 | 2 | S | 2 HCl | 204–205 |
| 26 | 4—F—C$_6$H$_4$ | C$_6$H$_5$ | 3 | 2 | S | 2 HCl/H$_2$O | 254–255 |
| 27 | 4—F—C$_6$H$_4$ | C$_6$H$_5$ | 3 | 2 | N—CH$_3$ | di-maleinate | 150–151 |
| 28 | 4—F—C$_6$H$_4$ | 4—CH$_3$CONH—C$_6$H$_4$ | 3 | 2 | O | di-maleinate | 172–174 |
| 29 | 4—F—C$_6$H$_4$ | 3—CH$_3$—C$_6$H$_4$ | 3 | 2 | S | 2 HCl | 242 |
| 30 | 4—F—C$_6$H$_4$ | 4—CH$_3$—C$_6$H$_4$ | 3 | 2 | S | 2 HCl | 246 |
| 31 | 4—F—C$_6$H$_4$ | C$_6$H$_5$ | 3 | 3 | S | di-maleinate | 124 |
| 32 | 4—F—C$_6$H$_4$ | 4—Cl—C$_6$H$_4$ | 3 | 2 | S | 2 HCl | 262 |
| 33 | 4—F—C$_6$H$_4$ | 4—F—C$_6$H$_4$ | 3 | 2 | S | 2 HCl | 234–236 |
| 34 | 4—F—C$_6$H$_4$ | 3—CF$_3$—C$_6$H$_4$ | 3 | 2 | O | 2 HCl | 232–235 |
| 35 | 4—F—C$_6$H$_4$ | 4—H$_3$CO—C$_6$H$_4$ | 3 | 2 | O | 2 HCl | 185–189 |
| 36 | 4—F—C$_6$H$_4$ | 3—O$_2$N—C$_6$H$_4$ | 3 | 2 | O | 2 HCl | 219–223 |
| 37 | 4—F—C$_6$H$_4$ | 3—CH$_3$O—C$_6$H$_4$ | 3 | 2 | O | 2 HCl | 185 |
| 38 | 4—F—C$_6$H$_4$ | 3—CH$_3$/4—Cl—C$_6$H$_3$ | 3 | 2 | O | 2 HCl | 183 |
| 39 | 4—F—C$_6$H$_4$ | 2—CH$_3$/4—Cl—C$_6$H$_3$ | 3 | 2 | O | 2 HCl | 156 |
| 40 | 4—F—C$_6$H$_4$ | 2—Cl/4—Cl—C$_6$H$_3$ | 3 | 2 | O | 2 HCl | 175 |
| 41 | 4—F—C$_6$H$_4$ | 2—i—C$_3$H$_7$/4—CH$_3$—C$_6$H$_3$ | 3 | 2 | O | 2 HCl | 155 |
| 42 | 4—F—C$_6$H$_4$ | 2—Allyl—C$_6$H$_4$ | 3 | 2 | O | 2 HCl | 152 |
| 43 | 4—F—C$_6$H$_4$ | α—naphthyl | 3 | 2 | O | 2 HCl | 152 |
| 44 | 4—F—C$_6$H$_4$ | β—naphthyl | 3 | 2 | O | 2 HCl | 147 |
| 45 | 4—F—C$_6$H$_4$ | 4—F—C$_6$H$_4$ | 3 | 2 | O | 2 HCl | 175–177 |
| 46 | 4—F—C$_6$H$_4$ | 3—CH$_3$/4—CH$_3$—C$_6$H$_3$ | 3 | 2 | O | 2 HCl | 239 |
| 47 | 4—F—C$_6$H$_4$ | 3—CH$_3$/5—CH$_3$—C$_6$H$_3$ | 3 | 2 | O | 2 HCl | 242 |
| 48 | 4—F—C$_6$H$_4$ | 2—CH$_3$/3—CH$_3$—C$_6$H$_3$ | 3 | 2 | O | 2 HCl | 246–248 |
| 49 | 4—F—C$_6$H$_4$ | 2—CH$_3$/6—CH$_3$—C$_6$H$_3$ | 3 | 2 | O | 2 HCl | 247–248 |
| 50 | 4—F—C$_6$H$_4$ | 3—Cl/5—CH$_3$O—C$_6$H$_3$ | 3 | 2 | O | 2 HCl | 230–233 |
| 51 | 4—F—C$_6$H$_4$ | 2—CH$_3$/5—CH$_3$—C$_6$H$_3$ | 3 | 2 | O | 2 HCl | 240–245 |

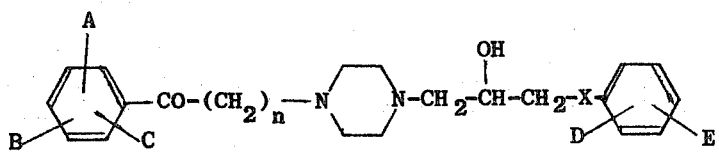

in which A, B and C are each a hydrogen, halogen, or an alkoxy group, the alkyl moiety of which has up to 4 carbon atoms, D and E are each a hydrogen, halogen, trifluoromethyl, nontertiary alkyl, or alkanoylamino group, the alkyl moiety of which has up to 4 carbon atoms, or a nonadjacent nitro group, X is oxygen or sulfur, and n is 2 or 3, and pharmaceutically acceptable acid addition salts thereof.

2. A compound as defined in claim 1 having the formula

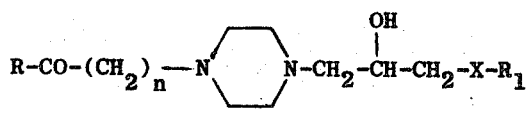

in which X is oxygen or sulfur, $n$ is 2 or 3, R is a substituent of the group consisting of phenyl, 3-methoxyphenyl, 4-methoxyphenyl, 3,4-dimethoxyphenyl, 3,4,5-trimethoxyphenyl, 4-chlorophenyl, and 4-fluorophenyl, and $R_1$ is a substituent of the group consisting of phenyl, 2-methylphenyl, 3-methylphenyl, 4-methylphenyl, 2,3-dimethylphenyl, 2,5-dimethylphenyl, 3,4-dimethylphenyl, 3,5-dimethylphenyl, 2,6-dimethylphenyl, 2-isopropyl-4-methylphenyl, 2-methoxyphenyl, 3-methoxyphenyl, 4-methoxyphenyl, 4-fluorophenyl, 2-chlorophenyl, 4-chlorophenyl, 2,4-dichlorophenyl, 2-chloro-5-methylphenyl, 4-chloro-2-methylphenyl, 2-chloro-5-methoxyphenyl, 3-chloro-5-methoxyphenyl, 3-trifluoromethylphenyl, 3-nitrophenyl, 4-nitrophenyl, and 4-acetamidophenyl, or a pharmaceutically acceptable acid addition salt thereof.

3. The compound of claim 1 which is $N_1$-[3-(4'-fluorobenzoyl)-propyl]-$N_2$-[3-(4'-chlorophenoxy)-2hydroxypropyl]-piperazine.

4. The compound of claim 1 which is $N_1$-[3-(4'-fluorobenzoyl)-propyl]-$N_2$-(3-phenoxy-2-hydroxypropyl)-piperazine.

5. The compound of claim 1 which is $N_1$-[2-(4'-fluorobenzoyl)-ethyl]-$N_2$-[3-(2'-chlorophenoxy)-2-hydroxypropyl]-piperazine.

6. The compound of claim 1 which is $N_1$-[2-(4'-fluorobenzoyl)-ethyl]-$N_2$-(3-phenoxy-2-hydroxypropyl)-piperazine.

7. The compound of claim 1 which is $N_1$-(2-benzoylethyl)-$N_2$-(3-phenoxy-2-hydroxypropyl)-piperazine.

8. The compound of claim 1 which is $N_1$-[2-(3'-methoxybenzoyl)-ethyl]-$N_2$-(3-phenoxy-2-hydroxypropyl)-piperazine.

9. The compound of claim 1 which is $N_1$-[2-(4'-chlorobenzoyl)-ethyl]-$N_2$-(3-phenoxy-2-hydroxypropyl)-piperazine.

10. The compound of claim 1 which is $N_1$-[2-(4'-chlorobenzoyl)-ethyl]-$N_2$-[3-(2'chlorophenoxy)-2-hydroxypropyl]-piperazine.

11. The compound of claim 1 which is $N_1$-(2-benzoylethyl)-$N_2$-[3-(2'-chlorophenoxy)-2-hydroxypropyl]-piperazine.

12. The compound of claim 1 which is $N_1$-[2-(3'-methoxybenzoyl)-ethyl]-$N_2$-[3-(2'-chlorophenoxy)-2-hydroxypropyl]-piperazine.

13. The compound of claim 1 which is $N_1$-[2-(4'-methoxybenzoyl)-ethyl]-$N_2$-[3-(2'chlorophenoxy)-2-hydroxypropyl]-piperazine.

14. The compound of claim 1 which is $N_1$-[2-(3', 4'-dimethoxybenzoyl)-ethyl]-$N_2$-[3-(2'-chlorophenoxy)-2-hydroxypropyl]-piperazine.

15. The compound of claim 1 which is $N_1$-(2-benzoylethyl)-$N_2$-[3-(2-methylphenoxy)-2-hydroxypropyl]-piperazine.

16. The compound of claim 1 which is $N_1$-]2-(3',4',5'-trimethoxybenzoyl)-ethyl]-$N_2$-(3-phenoxy-2-hydroxypropyl)-piperazine.

17. The compound of claim 1 which is $N_1$-[3-(4'-fluorobenzoyl)-propyl]-$N_2$-[3-(2'-chlorophenoxy)-2-hydroxypropyl]-piperazine.

18. The compound of claim 1 which is $N_1$-[3-(4'-fluorobenzoyl)-propyl]-$N_2$-[3-(2'-methylphenoxy)-2-hydroxypropyl]-piperazine.

19. The compound of claim 1 which is $N_1$-[3-(4'-fluorobenzoyl)-propyl]-$N_2$-[3-(2'-methoxyphenoxy)-2-hydroxypropyl]-piperazine.

20. The compound of claim 1 which is $N_1$-[3-(4' fluorobenzoyl)-propyl]-$N_2$-[3-(4'-nitrophenoxy)-2-hydroxypropyl]-piperazine.

21. The compound of claim 1 which is $N_1$-[3-(4'-methoxybenzoyl)-propyl]-$N_2$-(3-phenoxy-2-hydroxypropyl)-piperazine.

22. The compound of claim 1 which is $N_1$-[3-(4'-fluorobenzoyl)-propyl]-$N_2$-[3-(2'-chloro-5'-methylphenoxy)-2-hydroxypropyl]-piperazine.

23. The compound of claim 1 which is $N_1$-[2-(4'-chlorobenzoyl)-ethyl]-$N_2$-[3-(2'-methylphenoxy)-2-hydroxypropyl]-piperazine.

24. The compound of claim 1 which is $N_1$-[2-(4'-methoxybenzoyl)-ethyl]-$N_2$-(3 phenthio-2-hydroxypropyl)-piperazine.

25. The compound of claim 1 which is $N_1$-[3, (4'-fluorobenzoyl)-propyl]-$N_2$-(3-phenthio-2-hydroxypropyl)-piperazine.

26. The compound of claim 1 which is $N_1$-[3-(4'-fluorobenzoyl)-propyl]-$N_2$-[3-(4'-acetylaminophenoxy)-2-hydroxypropyl]-piperazine.

27. The compound of claim 1 which is $N_1$-[3-(4'-fluorobenzoyl)-propyl]-$N_2$-[3-(3'-methylphenthio)-2-hydroxypropyl]-piperazine.

28. The compound of claim 1 which is $N_1$-[3-(4'-fluorobenzoyl)-propyl]-$N_2$-[3-(4'-methylphenthio)-2-hydroxypropyl]-piperazine.

29. The compound of claim 1 which is $N_1$-[3-(4'-fluorobenzoyl)-propyl]-$N_2$-[3-(4'-chlorphenthio-2-hydroxypropyl]-piperazine.

30. The compound of claim 1 which is $N_1$-[3-(4'- fluorobenzoyl)-propyl]-$N_2$-[3-(4'-fluorophenthio)-2-hydroxypropyl]-piperazine.

31. The compound of claim 1 which is $N_1$-[3-(4'-fluorobenzoyl)-propyl]-$N_2$-[3-(3'-trifluoromethylphenoxy)-2-hydroxypropyl]-piperazine.

32. The compound of claim 1 which is $N_1$-[3-(4'-fluorobenzoyl)-propyl]-$N_2$-[3-(4'-methoxyphenoxy)-2-hydroxypropyl]-piperazine.

33. The compound of claim 1 which is $N_1$-[3-(4'-fluorobenzoyl)-propyl]-$N_2$-[3-(3'-nitrophenoxy)-2-hydroxypropyl]-piperazine.

34. The compound of claim 1 which is $N_1$-[3-(4'-fluorobenzoyl)-propyl]-$N_2$-[3-(3'-methoxyphenoxy)-2-hydroxypropyl]-piperazine.

35. The compound of claim 1 which is $N_1$-[3-(4'-fluorobenzoyl)-propyl]-$N_2$-[3-(3'-methyl-4'-chlorophenoxy)--2-hydroxypropyl]-piperazine.

36. The compound of claim 1 which is $N_1$-[3-(4'-fluorobenzoyl)-propyl]-$N_2$-[3-(2'-methyl-4'-chlorophenoxy)--2-hydroxypropyl]-piperazine.

37. The compound of claim 1 which is $N_1$-[3-(4'-fluorobenzoyl)-propyl]-$N_2$-[3-(2',4'-dichlorophenoxy)-2-hydroxypropyl]-piperazine.

38. The compound of claim 1 which is $N_1$-[3-(4'-fluorobenzoyl)-propyl]-$N_2$-[3-(2'-isopropyl-4'-methylphenoxy)--2-hydroxypropyl]-piperazine.

39. The compound of claim 1 which is $N_1$-[3-(4'-fluorobenzoyl)-propyl]-$N_2$-[3-(4'-fluorophenoxy)-2-hydroxypropyl]-piperazine.

40. The compound of claim 1 which is $N_1$-[3-(4'-fluorobenzoyl)-propyl]-$N_2$-[3-(3',4'-dimethylphenoxy)-2-hydroxypropyl]-piperazine.

41. The compound of claim 1 which is $N_1$-[3-(4'-fluorobenzoyl)-propyl]-$N_2$-[3-(3',5'-dimethylphenoxy)-2-hydroxypropyl]-piperazine.

42. The compound of claim 1 which is $N_1$-[3-(4'-fluorobenzoyl)-propyl]-$N_2$-[3-(2',3'-dimethylphenoxy)-2-hydroxypropyl]-piperazine.

43. The compound of claim 1 which is $N_1$-[3-4'-fluorobenzoyl)-propyl]-$N_2$-[3-(2',6'-dimethylphenoxy)-2-hydroxypropyl]-piperazine.

44. The compound of claim 1 which is $N_1$-[3-(4'-fluorobenzoyl)-propyl]-$N_2$-[3-(3'-chloro-5'-methoxyphenoxy)-2-hydroxypropyl]-piperazine.

45. The compound of claim 1 which is $N_1$-[3-(4'-fluorobenzoyl)-propyl]-$N_2$-[3-(2',5'-dimethylphenoxy)-2-hydroxypropyl]-piperazine.

* * * * *